(12) United States Patent
McGhee et al.

(10) Patent No.: US 11,440,693 B2
(45) Date of Patent: Sep. 13, 2022

(54) MANUFACTURING PROCESS FOR PACKAGED PET FOOD

(71) Applicant: The Iams Company, Cincinnati, OH (US)

(72) Inventors: Romian Rushard McGhee, Cincinnati, OH (US); Allan Jay Root, Springboro, OH (US); Jeffrey Wayne Aubuchon, West Chester, OH (US); Nicholas A. Di Blasi, Cincinnati, OH (US); Scott Clayton Keck, Deshler, OH (US)

(73) Assignee: Mars, Incorporated, McLean, VA (US)

( * ) Notice: Subject to any disclaimer, the term of this patent is extended or adjusted under 35 U.S.C. 154(b) by 924 days.

(21) Appl. No.: 14/205,465

(22) Filed: Mar. 12, 2014

(65) Prior Publication Data

US 2014/0260109 A1    Sep. 18, 2014

Related U.S. Application Data

(60) Provisional application No. 61/778,459, filed on Mar. 13, 2013.

(51) Int. Cl.
*B65B 51/14* (2006.01)
*B29C 65/00* (2006.01)
(Continued)

(52) U.S. Cl.
CPC ............ *B65B 51/146* (2013.01); *B29C 65/18* (2013.01); *B29C 66/1122* (2013.01);
(Continued)

(58) Field of Classification Search
CPC ... B65B 51/146; B29C 65/18; B29C 66/1122; B29C 66/232; B29C 66/43121; B29C 66/91231; B29C 66/91421; B29C 66/91423; B29C 66/919; B29C 65/48; B29C 66/3492; B29C 66/72321; B29C 66/72328; B29C 66/7352; B29C 66/8122; B29C 66/81419
(Continued)

(56) References Cited

U.S. PATENT DOCUMENTS 2,390,550 A * 12/1945 George ............. B29C 66/81457
493/190
2,589,756 A * 3/1952 Waters .................... B29C 65/18
100/325
(Continued)

FOREIGN PATENT DOCUMENTS

EP    1149766 A2    10/2001
EP    2969480 B1    5/2020
(Continued)

OTHER PUBLICATIONS

PCT International Search Report dated lun. 27, 2014—6 pages.
(Continued)

*Primary Examiner* — Sameh Tawfik
(74) *Attorney, Agent, or Firm* — Waller Lansden Dortch & Davis, LLP; Matthew C. Cox

(57) ABSTRACT

Pet food bags, and methods of making the same, contain a seal that resists air exchange more than conventional bags thereby protecting nutritional ingredients that are susceptible to oxidation.

15 Claims, 2 Drawing Sheets

(51) Int. Cl.
*B29C 65/18* (2006.01)
*B65B 25/06* (2006.01)
*B29C 65/48* (2006.01)
*B29L 31/00* (2006.01)

(52) U.S. Cl.
CPC ...... *B29C 66/232* (2013.01); *B29C 66/43121* (2013.01); *B29C 66/919* (2013.01); *B29C 66/91231* (2013.01); *B29C 66/91421* (2013.01); *B29C 66/91423* (2013.01); *B65B 25/06* (2013.01); *B29C 65/48* (2013.01); *B29C 66/3492* (2013.01); *B29C 66/72321* (2013.01); *B29C 66/72328* (2013.01); *B29C 66/7352* (2013.01); *B29C 66/8122* (2013.01); *B29C 66/81419* (2013.01); *B29C 66/81457* (2013.01); *B29C 66/81811* (2013.01); *B29C 66/8242* (2013.01); *B29C 66/83221* (2013.01); *B29C 66/849* (2013.01); *B29C 66/929* (2013.01); *B29C 66/949* (2013.01); *B29L 2031/7128* (2013.01)

(58) Field of Classification Search
USPC .......................................................... 53/469
See application file for complete search history.

(56) References Cited

U.S. PATENT DOCUMENTS

| | | | |
|---|---|---|---|
| 2,646,105 A | 7/1953 | Nicholas | |
| 2,928,216 A * | 3/1960 | Orsini | B65B 9/023 53/434 |
| 3,291,374 A | 12/1966 | Lepisto et al. | |
| 3,346,173 A | 10/1967 | Smith et al. | |
| 3,370,773 A | 2/1968 | Mayo | |
| 3,415,440 A | 12/1968 | Watters | |
| 3,518,809 A * | 7/1970 | Ott | B65B 31/06 53/511 |
| 3,625,712 A | 12/1971 | Wilson | |
| 3,784,085 A | 1/1974 | Kilgore | |
| 3,847,712 A | 11/1974 | Hubbard | |
| 4,117,306 A | 9/1978 | Shah | |
| 4,656,818 A * | 4/1987 | Shimoyama | B29C 66/0342 53/374.4 |
| 4,941,310 A * | 7/1990 | Kristen | B65B 31/046 53/512 |
| 5,044,142 A * | 9/1991 | Gianelli | B65B 31/024 53/434 |
| 5,087,235 A * | 2/1992 | Lafleur | B29C 65/18 383/66 |
| 5,284,002 A * | 2/1994 | Fowler | B29C 65/38 493/194 |
| 5,330,133 A | 7/1994 | Rasmussen et al. | |
| 5,419,801 A * | 5/1995 | McDonald | B29C 65/18 156/581 |
| 5,616,569 A | 4/1997 | Reinhart | |
| 5,851,573 A | 12/1998 | Lepine et al. | |
| 5,932,258 A | 8/1999 | Sunvold | |
| 6,039,952 A | 3/2000 | Sunvold et al. | |
| 6,133,323 A | 10/2000 | Hayek | |
| 6,214,392 B1 | 4/2001 | Ramirez | |
| 6,232,579 B1 * | 5/2001 | Chou | B29C 66/81821 219/229 |
| 6,335,515 B1 * | 1/2002 | Chou | B29C 66/8614 219/233 |
| 6,543,206 B2 * | 4/2003 | Seward | H04M 1/725 53/284.7 |
| 6,739,370 B2 * | 5/2004 | Melheim | B29C 66/8163 100/258 A |
| 6,810,642 B2 * | 11/2004 | Cortigiano, Sr. | B29C 66/4322 493/213 |
| 7,779,612 B2 * | 8/2010 | Fergusson | B65B 9/213 53/451 |
| 7,986,244 B2 * | 7/2011 | Jokele | G01D 7/08 340/540 |
| 8,572,936 B2 | 11/2013 | Giordano et al. | |
| 9,856,042 B2 * | 1/2018 | Moessnang | B65B 31/024 |
| 2001/0053253 A1 | 12/2001 | Buchman et al. | |
| 2002/0139704 A1 | 10/2002 | Buchman | |
| 2004/0020913 A1 * | 2/2004 | Hovorka | B29C 66/1122 219/243 |
| 2004/0139701 A1 * | 7/2004 | Cady | B29C 66/73715 53/434 |
| 2005/0108990 A1 | 5/2005 | Kahn et al. | |
| 2007/0084142 A1 | 4/2007 | Matthews | |
| 2008/0148945 A1 | 12/2008 | Germain et al. | |
| 2009/0255218 A1 * | 10/2009 | Moessnang | B65B 31/024 53/433 |
| 2009/0294336 A1 | 12/2009 | Jassim | |
| 2011/0150368 A1 | 6/2011 | Ellsworth et al. | |
| 2011/0289885 A1 * | 12/2011 | Re | B29C 65/224 53/432 |
| 2013/0026170 A1 | 1/2013 | Zerfas et al. | |

FOREIGN PATENT DOCUMENTS

| | | |
|---|---|---|
| GB | 2270895 A | 3/1994 |
| JP | 2002096805 A | 4/2002 |
| JP | 2007069941 A | 3/2007 |
| JP | 2012056596 A | 3/2012 |
| WO | 9311054 A1 | 6/1993 |
| WO | 32070606 A1 | 9/2002 |
| WO | 2008148945 | 12/2008 |
| WO | 2008148945 A1 | 12/2008 |
| WO | 2009133075 A1 | 11/2009 |
| WO | 2013148973 A1 | 10/2013 |
| WO | 2014159602 A1 | 10/2014 |

OTHER PUBLICATIONS

Brooks, et al., "PET Packaging Technology", Sankt-Petersburg, Profession, 2006, pp. 197-198.
Schrader, "Manufacturing and welding of plastics", Moscow Machine Manufacturing, 1980, pp. 95, 97, 143.
Abstract of JP2002096805A.
Abstract of JP2007069941A.
Abstract of JP2012056596A.
Abstract of WO2008148945A1.
European Patent Application No. EP14715187.2, EPO Preliminary Opinion of the Opposition Division, dated Mar. 24, 2022, 12 pages.
Richard Coles et al; "Food Packaging Technology"; 2003 Blackwell Publishing Ltd.; 368 pages.

* cited by examiner

MANUFACTURING PROCESS FOR PACKAGED PET FOOD

FIELD OF THE INVENTION

The invention is directed to methods of sealing pet food bags.

BACKGROUND OF THE INVENTION

Bags suitable for containing dog or cat food are known. Typically these bags have at least one seal along one side of the bag that allows some air exchange to accommodate atmospheric pressure changes that happen during shipping (e.g., crossing a mountain range). Recently, however, many dog and cat foods are containing nutrients that are sensitive to oxidation (e.g., some pro-biotics). Seals that generally allow for free air exchange between inside and outside of the bag may undesirably increase the rate of oxidative degradation of the nutrient.

There is a need to provide a seal that resists the flow of air more than conventional seals particularly in pet food bags that contain pet foods having air sensitive ingredients. There is a further need to provide the seal in manner that is suitable for high speed manufacturing process that provides commercially acceptable tolerances and is cost effective.

An additional problem can result from those seals that have a high degree of air exchange integrity. Some amount of air in the bag is necessary to optimize shipping. Too little air pressure and the contents, e.g., kibble shaped pet food, will not flow and the contents will not be distributed evenly in the bag and it will not lie flat. This creates problems in stacking the bags. However, too much air pressure inside the bag creates susceptibility to bursting. Therefore, there is a need to seal the bag with a specific amount of air pressure or contained air volume.

Yet a further problem with a bag of high seal integrity is the pressures exert during shipping (e.g., crossing the high elevation of a mountain range). There is a need to accommodate these pressure changes (e.g., venting) while minimizes air exchange and yet to do so cost effectively.

Lastly, the seals must be strong enough to withstand stresses associated with the relatively large weights associated with dog or cat food.

SUMMARY OF THE INVENTION

The present invention attempts to address one or more of these problems. A first aspect of the invention provides for a method of sealing together a first substrate and a second substrate of a pet food bag comprising the step of contacting an outside surface of the first substrate at a first location with a first heating bar, and contacting an outside surface of the second substrate at second location with a first non-heating bar to form a first seal between the first location and the second location. The first location and second location are opposing. In a preferred embodiment, a second seal is formed (in close proximity to the first seal) using a similar process.

A second aspect of the invention provides for a pet food product comprising 30 lb to 55 lb of pet food contained in a pet food bag. The pet food comprises an ingredient susceptible to oxidative degradation. The pet food bag is made from a least a first substrate and a second substrate. The bag is configured to contain a volume from 27 liters to 80 liters. The bag contains 1.5 liters to 3.5 liters of entrapped air. The bag has a first seal and a second seal to seal the pet food and entrapped air inside the bag. These seals are in close proximity to each other and collectively provide a relatively high degree of air exchange integrity. The bag has at least one corner made from either the first substrate or the second substrate. At least one corner slit is provided in the at least one corner. The corner slit is configured to exchange air between the atmospheric air and the air contained in the sealed pet food bag under certain environmental conditions or stresses.

DETAILED DESCRIPTION OF THE INVENTION

Figure 1:
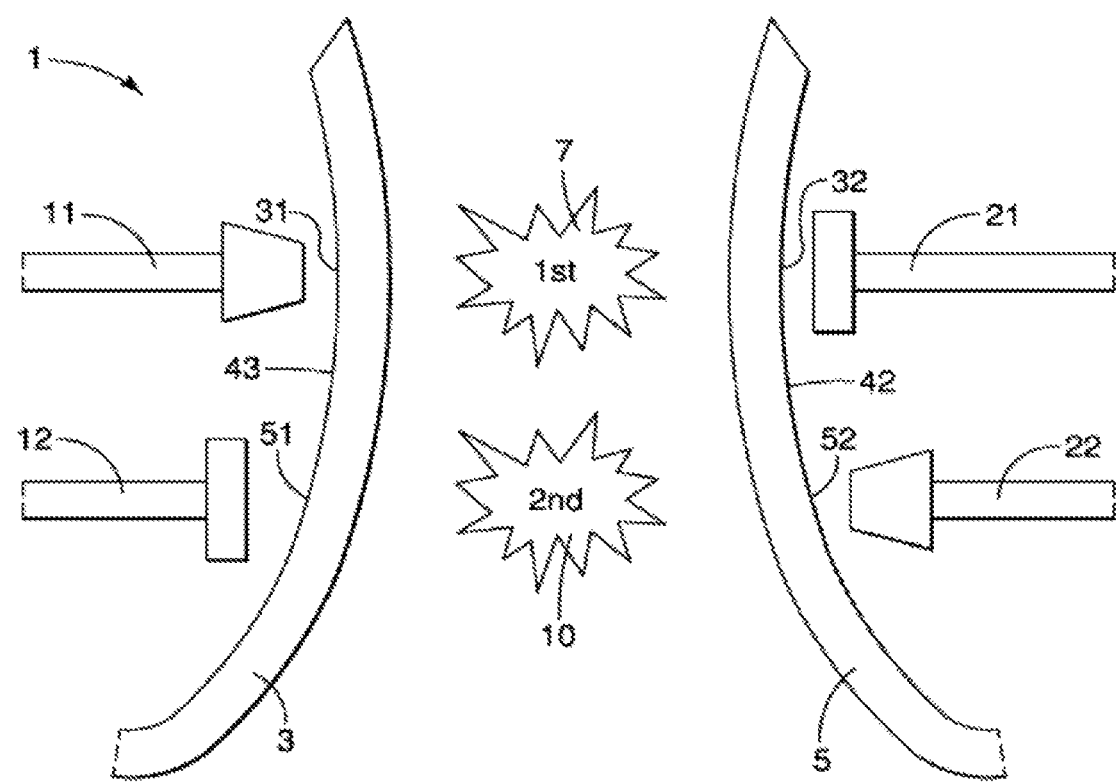
FIG. 1 is a cross sectional view of a method of making improved seals in accordance with an embodiment of the present invention.

This application claims the benefit of U.S. Provisional Application Ser. No. 61/778,459, filed Mar. 13, 2013, the entirety of which is incorporated by reference herein.

Pet food bags are comprised of substrates, preferably multi-ply substrates. The pet food contained in these bags needs to be sealed within the bag after having been deposited into the bag during the manufacturing process. A first aspect of the invention is directed to a method of providing a first seal between a first and second substrate forming the pet food bag. The method comprises the step of contacting an outside surface of the first substrate at a first location with a first heating bar, and contacting an outside surface of the second substrate at a second location with a first non-heating bar, wherein the first location and second location are opposing, to form a first seal between the first location and the second location.

The method also provides forming a second seal adjacent the first seal. Similar to the first seal, the method comprises the step of contacting the outside surface of the first substrate at a third location with a second non-heating bar; and contacting the outside surface of the second substrate at a fourth location with a second heating bar, wherein the third location and the fourth location are opposing, to form the second seal between the third location and the fourth location. In some instances the method comprises the step of contacting the outside surface of the first substrate at a third location with a second heating bar; and contacting the outside surface of the second substrate at a fourth location with a second non-heating bar, wherein the third location and the fourth location are opposing, to form the second seal between the third location and the fourth location.

Without wishing to be bound by theory, it is the opposing interface between a heating bar and non-heating bar in providing the seal between the substrates that provides superior results as compared to using two opposing heating bars.

In an alternative, but less preferred embodiment, the method comprising the step of forming the second seal wherein the first heating bar and the second heating bar contacting the outside surface of the same substrate.

Heating Bars

The heating bar(s) of the present invention comprise a thermally conductive material. Typically a metal is used. In one embodiment, the heating bar is comprised of nichrome (e.g., 80% nickel and 20% chromium by weight) sealed inside stainless steel, which is milled to a desired heating bar shape.

The heating bars are heated through conventional means to achieve a desired temperature. For example, the heating bar (or at least the thermally conductive material portion) may be in thermal communication to a heating element. The temperature, measured at a surface of the heating bar configured to contact an outside surface of a substrate, is from 200° F. to 600° F., preferably 300° F. to 500° F., more preferably from 350° F. to 450° F., still more preferably from 375° to 425°, alternatively from 390° F. to 415° F., or 395° F. to 415° F., or 400° F. to 410° F., or 405° F. to 410° F., or 400° F. to 405° F., alternatively combinations thereof. The temperature of the first heated bar can be the same or different as compared to the temperature of the second heated bar. In another embodiment, a third or fourth or more heated bars can be used to provide a third or fourth or more seals. These third or fourth or more heated bars can have the same or different temperatures from each other.

In one embodiment, the heating bar has on overall trapezoidal shape. In another embodiment, the portion of the heating bar configured to make contact with the substrate to be sealed is preferably flat, more preferably flat and smooth. The portion of the heating bar configured to make contact with the substrate may have a rectangular shape. The portion of the heating bar configured to make contact with the substrate may have a width of not greater than 1.0 inch, alternatively from 0.001 inch to 0.5 inch, preferably from 0.05 inch to 0.2 inch, alternatively from 0.08 inch to 0.2 inch, alternatively about 0.125 inch, alternatively combinations thereof. The heating bar may have length, at least the portion of the heating bar configured to contact with the substrate, from 5 inches to 25 inches, alternatively from 10 inches to 20 inches, alternatively from 12 inches to 18 inches, alternatively 18 inches to 24 inches, alternatively about 14.5 inches, alternatively about 22 inches, alternatively combinations thereof. These dimensions may be the same or different for those embodiments having two or more heating bars.

Non-Heating Bars

One aspect of the invention provides for one or more non-heating bar(s). The non-heating bar can be made of any material, but preferably comprises an elastomeric material. Preferably the non-heating bar comprises an elastomeric material configured to contact an outside surface of a substrate. The elastomeric material preferably comprises an ethylene propylene diene monomer (EPDM). The non-heating bar may be made entirely of the elastomeric material, or simply coated or connected with such a material, or at least that portion of the non-heating bar configured to contact the surface of the substrate. The portion of the non-heating bar configured to make contact with the substrate is preferably flat, more preferably flat and smooth. The portion of the non-heating bar configured to make contact with the substrate may have a rectangular shape. The portion of the non-heating bar configured to make contact with the substrate may have a width of not greater than 1 inch, alternatively from 0.001 inch to 0.5 inch, preferably from 0.05 inch to 0.2 inch, alternatively from 0.08 inch to 0.2 inch, alternatively about 0.125 inch, alternatively combinations thereof. The non-heating bar may have length, at least the portion of the non-heating bar configured to contact with the substrate, from 5 inches to 25 inches, alternatively from 10 inches to 20 inches, alternatively from 12 to 18 inches, alternatively from 18 inches to 24 inches, alternatively 14.5 inches, alternatively 22 inches, alternatively combinations thereof. The dimensions may be the same or different for other non-heating bars configured for making additional seals. The portion of the heating bar that is opposing the non-heating bar may be the same or different than the non-heating bar portion.

In one embodiment, the non-heating bar comprises EPDM and is extruded to form a desired shape. The non-heating bar is a combination of stainless that is milled to accept the shaped EPDM. The use of a dovetail may be used to combine the shaped EPDM and stainless steel portion of the non-heating bar. It is the EDPM portion that is configured to make contact with the outer surface of the substrate.

The temperature of the surface of the non-heating bar configured to make contact with the substrate is less than 200° F., preferably less than 150° F., alternatively less than 125° F., alternatively about ambient temperature, alternatively from 0° C. to less than 200° F., alternatively from 32° F. to 175° F., alternatively combinations thereof. In another embodiment, the non-heating bar is not in thermal communication to a heating element. In yet another embodiment, any temperature above ambient temperature of the non-heating bar may be attributable to the manufacturing process (and conditions thereof) and not, for example, from a heating element that is in thermal communication with the non-heating bar. In yet still another embodiment, the non-heating bar is in thermal communication with a cooling element (e.g., refrigeration coil etc).

Dimensions of the non-heating bar, or at least that portion configured to contact the substrate, are the same or similar as the opposing heating bar, and vice versa.

In one embodiment, the first seal and the second seal are formed within 0.5 inches of each other. Preferably, this distance is within 0.4 inches, or within 0.3 inches, or within 0.25 inches, alternatively the distances are from 0.1 inch to 0.4 inch, or from 0.2 inch to 0.3 inch, or combinations thereof. Similar distances may also be formed between the second seal and a third seal; and between the third seal and a fourth seal.

Pressure

Another aspect of the invention provides for pressure to be exerted between a heating bar and an opposing non-heating bar (and substrates there between) to form a seal. The pressure exerted between the heating bar and the non-heating bar may be piston driven. One, two, three or more pistons, preferably pneumatically driven piston(s), for each bar may be used to move the bars and/or exert pressure. Preferably each of the opposing bars is moved along the same linear plane. The exerted pressure is from 30 pounds per square inch (psi) to 140 psi, preferably 40 to 130 psi, more preferably from 50 psi to 120 psi, alternatively from 60 psi to 110 psi, alternatively from 70 psi to 100 psi, alternatively from 80 psi to 90 psi, alternatively combinations thereof. In those embodiments, where two or more sets of opposing heating bar and non-heating bar are used, the pressures may be the same or different among these different sets.

Seal duration time, in one embodiment, is the time that it takes to form a seal according the present invention. A first seal duration time is directed to the time it takes to form the first seal. A second seal duration time is directed to the time it takes to form the second seal. Additional seal duration times (i.e., a third, fourth, etc.) are provided for additional seals (i.e., a third, fourth, etc., respectively). The seal duration time is measured by starting the time when either an opposing heating bar or non-heating bar first contacts an outside surface of a substrate to be sealed, and stopping the time the later of either the opposing heating bar or non-heating bar finishes making contact with the outside surface of the respective substrate after having made the seal. In one embodiment, the seal duration time is from 0.5 seconds (sec) to 10 sec, preferably from 1 sec to 4 sec, more preferably from 1 sec to 3 sec, alternatively from 2 sec to 3 sec, alternatively from 1.7 sec to 2.5 sec, alternatively combinations thereof.

Filling Bags with Pet Food

One embodiment of the invention provides the step of filling an open pet food bag with pet food, preferably before the step of sealing the bag closed (wherein the seal(s) are formed per the present invention). The bag, in this preferred embodiment, is sealed on three sides to leave the final fourth side open for filling. The pet food, which the open bag is filled with, weighs from 10 pounds (lb) to 100 lb, alternatively from 30 lb to 55 lb, alternatively from 40 lb to 50 lb, alternatively from 40 lb to 45 lb, alternatively combinations thereof.

The pet food bag may be configured to contain a maximum volume from 20 liters (l) to 90 l, preferably from 20 l to 80 l, alternatively from 30 l, to 70 l, alternatively from 40 l to 60 l, alternatively from 40 l to 65 l, alternatively from 47 l to 60 l, alternatively combinations thereof.

The pet food, in one non-limiting example, may be for a cat or a dog. The pet food may be in the form of a kibble (but of course other forms may be used). The pet food may contain an ingredient that is sensitive to oxidation (e.g., pro-biotic). Pet food is generally described in U.S. Pat. Nos.: 5,616,569; 6,039,952; 6,133,323; 5,851,573; 5,932,258.

Entrapping Air

One embodiment of the invention provides for the step of sealing the pet food bag closed with a defined amount of entrapped air such that entrapped air contained within the sealed bag is from 0.5 l to 5 l, preferably from 1 l to 3 l of volume, alternatively from 1 l to 2 l, alternatively combinations thereof. The volume of air is measured at standard temperature and atmospheric pressure (i.e., 1 atmosphere and 77° F.). Air may be introduced into the bag, before sealing, under conventional means.

Another embodiment also provides for slitting one or more corners of the bag to form a corner slit. The pet food bags of the present invention are made of substrates. The substrates can form one or more corners of the pet food bag. Given the relatively high degree of integrity of the seal(s) of the present invention, there is a need for air exchange between air inside the bag and air inside the bag during significant environmental stresses or conditions (e.g., crossing a mountain range). The slit, of the corner slit, is one that at least a portion preferably traverses the entire thickness of at least one substrate.

The corner slits may have a length from 4 mm to 12 mm, preferably from 6 mm to 10 mm, alternatively about 8 mm, alternatively combinations thereof. The slit of the corner slit preferably penetrates all plies of a substrate (i.e., entirely through the substrate). The corner slit is placed preferably within 10 mm, preferably within 7 mm, preferably within 6 mm, preferably within 5 mm, preferably within 4 mm, alternatively within 3 mm, alternatively within 3 mm or less, alternatively combinations thereof, of an apex of a corner of the pet food bag. In another embodiment, more than one corner slit is provided. In such an embodiment, preferably the corner slits are in more than one corner of the bag and are in different substrates. For example, if the first substrate has a first corner slit in a first corner, then it is preferred that the second substrate has a second corner slit in a second corner. The sliting of the substrate(s) to form the corner slit(s) may be made conducted by razor, or a knife, or other similar cutting object.

Substrate

The first and second substrates of the present invention are made of material(s) that are suitable for constructing pet food bags, wherein preferably these materials are impermeable to air exchange. The substrate may be single ply or multiple plies. In one embodiment, the substrate of the bag is selected from two-ply or four-ply. Each ply may be a different or the same material. Plies may comprise paper, plastic, metal, or combinations thereof. The thickness of a substrate may be from 100 microns to 250 microns, alternatively from 125 microns to 200 microns, alternatively from 155 to 177 microns, alternatively combinations thereof. Non-limiting examples of substrates suitable for making pet food bags may include those described in U.S. Pat. Nos.: 3,291,374; 3,346,173; 3,370,773; 3,415,440; and 3,784,085.

The present invention may or may not be used with an adhesive to form the seal. When an adhesive is used, it is placed on an inside surface of a substrate at location where the seal is to be formed. In a preferred embodiment, a seal is formed without the use of an adhesive.

Example

FIG. 1 is a cross sectional view of a non-limiting example demonstrating the sealing of a bag (1) according to the present invention. The figure is not drawn to scale. A first substrate (3) and a second substrate (5) are opposing sides of an open bag (1). Although not shown, the open bag (1) contains pet food. A first seal (7) is formed between the first substrate (3) and the second substrate (5) by having a first heating bar (11) contacting an outside surface of the first substrate (43) at a first location (31) and having a first non-heating bar (21) contacting an outside surface of the second substrate (42) at a second location (32), wherein the first location (31) and the second location (32) are opposing each other. A further step is taken to form a second seal (10). A second non-heating bar (12) contacts the outside surface of the first substrate (43) at a third location (51) and a second heating bar (22) contacts the outside surface of the second substrate (42) at a fourth location (52) to form the second seal (10). The third location (51) and the fourth location (52) are opposing each other. This second step may be taken concurrently or subsequent to the first step. Pressure is excreted from about 80 psi to about 90 psi between the first heating bar (11) and the first non-heating bar (21) (and the first and second substrates (3, 5) there between) as well as between the second non-heating bar (12) and the second heating bar (22) (and the first and second substrates (3, 5) there between). The first and second seal duration times between these opposing sets of bars (11, 21 and 12, 22) in forming the seals (7, 10), respectively, is about 2 seconds. The temperature of the first and second heating bars (11, 22) is each from 400° F. to 405° F. The first and second non-heating bars (21, 22) are each not in thermal communication to a heating element.

Figure 2:
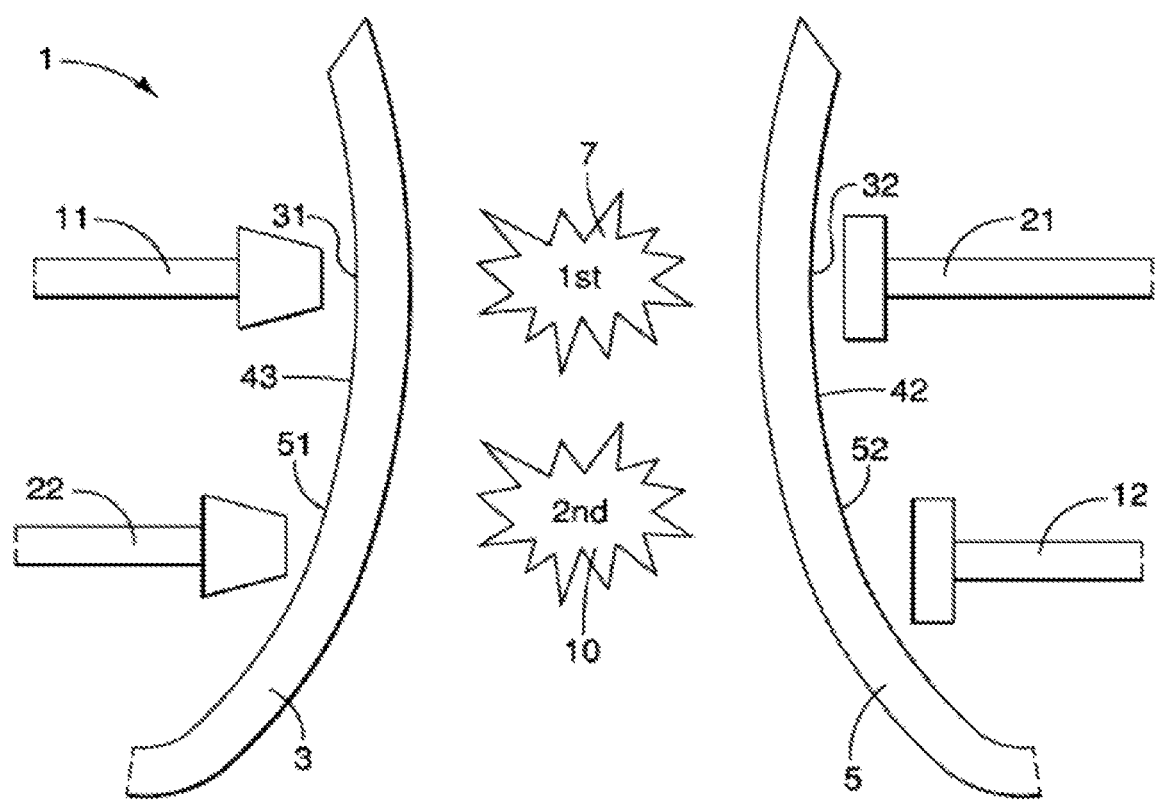
FIG. 2 is a cross sectional view of a method of making improved seals in accordance with another embodiment of the present invention.

FIG. 2 is a cross sectional view of a non-limiting example demonstrating the sealing of a bag (1) according to another embodiment of the present invention. The figure is not drawn to scale. The embodiment is akin to that shown in FIG. 1, except FIG. 2 shows a second heating bar (22) contacts the outside surface of the first substrate (43) at a third location (51) and a second non-heating bar (12) contacts the outside surface of the second substrate (42) at a fourth location (52) to form the second seal (10).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method comprising:
   contacting an outside surface of a first substrate at a first location with a first heating bar and contacting an outside surface of a second substrate at a second location that is opposite the first location with a first non-heating bar to form a first seal that seals the first substrate and the second substrate together at a location between the first location and the second location, wherein the first substrate and the second substrate form a pet food bag; and
   contacting the outside surface of the first substrate at a third location with a second heating bar and contacting the outside surface of the second substrate at a fourth location that is opposite the third location with a second non-heating bar to form a second seal that seals the first substrate and the second substrate together at a location between the third location and the fourth location.

2. A method comprising:
   contacting an outside surface of a first substrate at a first location with a first heating bar and contacting an outside surface of a second substrate at a second location that is opposite the first location with a first non-heating bar to form a first seal that seals the first substrate and the second substrate together at a location between the first location and the second location, wherein the first substrate and the second substrate form a pet food bag; and
   contacting the outside surface of the first substrate at a third location with a second non-heating bar and contacting the outside surface of the second substrate at a fourth location that is opposite the third location with a second heating bar to form a second seal that seals the first substrate and the second substrate together at a location between the third location and the fourth location.

3. The method of claim 2, further comprising heating the first heating bar to a temperature from 350° F. to 460° F., wherein said temperature is measured on a bar surface configured to contact the outside surface of the first substrate.

4. The method of claim 3, further comprising exerting pressure from 50 psi to 120 psi between the first heating bar and the first non-heating bar with the first and second substrates there between.

5. The method of claim 4, wherein the step of contacting the first and second locations includes a first seal duration time from about 1 second to about 4 seconds to form the first seal.

6. The method of claim 5, further comprising:
   heating the second heating bar to a temperature from 350° F. to 460° F., the temperature being measured on a bar surface configured to contact the outside surface of the second substrate; and
   exerting pressure from 50 psi to 120 psi between the second heating bar and the second non-heating bar with first and second substrates there between;
   wherein the step of contacting the third and fourth locations includes a second seal duration time from about 1 second to about 4 seconds to form the second seal.

7. The method of claim 6, further comprising filling the pet food bag with 30 lbs to 55 lbs of pet food before forming the first seal and the second seal.

8. The method of claim 7, further comprising entrapping air contained within the pet food bag, before forming the first seal, such that the entrapped air is from 1 to 3 liters of volume as measured at 1 atmosphere of atmospheric pressure and at 77° F.

9. The method of claim 8, wherein the pet food bag comprises at least one corner comprising at least the first substrate or second substrate each having a thickness, wherein the at least one corner has an apex, and the method further comprising the step of slitting at least the one corner of the pet food bag to provide a corner slit within 10 mm of the apex, wherein at least a portion of the slit traverses entirely through the thickness of either the first substrate or the second substrate, and wherein the corner slit is configured to exchange air between the atmospheric air and the air contained in the pet food bag.

10. The method of claim 9, wherein the first substrate and the second substrate are each multi-ply substrates, and each having the thickness from 100 microns to 225 microns.

11. The method of claim 6, wherein the first non-heating bar and the second non-heating bar are each not in thermal communication with a heating element.

12. The method of claim 11, further comprising the step of slitting at least one corner of the pet food bag to provide a corner slit configured to exchange air between the atmospheric air and the air contained in the pet food bag.

13. The method of claim 12, further comprising:
   filling the pet food bag with 35 lbs to 50 lbs of pet food before the steps of forming said first seal and forming said second seal;
   entrapping air in the pet food bag to contain 0.5 to 3 liters of air volume as measured at 1 atmosphere of atmospheric pressure and at 77° F.; and
   forming the second seal within 0.4 inches of the first seal.

14. The method of claim 13, where the first substrate and second substrate are each multi-ply substrates, and each have a thickness from 100 microns to 225 microns; and wherein said steps of forming the first seal and forming the second seal are each conducted in first and second seal duration times, respectively, from about 1 second to about 4 seconds.

15. A method comprising:
contacting an outside surface of a first substrate at a first location with a first heating bar and contacting an outside surface of a second substrate at a second location that is opposite the first location with a first non-heating bar to form a first seal that seals the first substrate and the second substrate together at a location between the first location and the second location, wherein the first substrate and the second substrate form a pet food bag,
wherein the first heating bar comprises a thermally conductive material configured to contact the outside surface of the first substrate, and
wherein first heating bar comprises a substantially trapezoidal shape comprising steel, and the thermally conductive material configured to contact the outside surface of the substrate further has a width from 1/32 inch to 1/2 inch.

* * * * *